(12) United States Patent
Lundh et al.

(10) Patent No.: US 7,130,627 B2
(45) Date of Patent: Oct. 31, 2006

(54) MANAGEMENT OF NEIGHBOR LISTS

(75) Inventors: Anders P. Lundh, Durham, NC (US);
Piroz Darai, Morrisville, NC (US)

(73) Assignee: Telefonaktiebolaget LM Ericsson (publ) (SE)

( * ) Notice: Subject to any disclaimer, the term of this patent is extended or adjusted under 35 U.S.C. 154(b) by 247 days.

(21) Appl. No.: 10/735,334

(22) Filed: Dec. 12, 2003

(65) Prior Publication Data

US 2005/0130655 A1    Jun. 16, 2005

(51) Int. Cl.
*H04Q 7/20*    (2006.01)
(52) U.S. Cl. ...................... 455/434; 455/524
(58) Field of Classification Search ........... 455/434, 455/439, 456.1, 524, 561, 436, 437, 438; 370/329–331
See application file for complete search history.

(56) References Cited

U.S. PATENT DOCUMENTS

| | | | |
|---|---|---|---|
| 5,666,650 A * | 9/1997 | Turcotte et al. ............. | 370/329 |
| 5,722,078 A * | 2/1998 | Przelomiec et al. ........ | 455/434 |
| 5,970,407 A * | 10/1999 | Brunner et al. ............. | 455/437 |
| 6,201,968 B1 | 3/2001 | Ostroff et al. | |
| 6,219,352 B1 * | 4/2001 | Bonomi et al. ............. | 370/417 |
| 6,289,220 B1 | 9/2001 | Spear | |
| 6,421,328 B1 * | 7/2002 | Larribeau et al. ........... | 370/329 |
| 6,917,809 B1 * | 7/2005 | Horwath et al. ............ | 455/436 |
| 7,050,803 B1 * | 5/2006 | Celedon et al. ............. | 455/436 |
| 2002/0102994 A1 * | 8/2002 | Tuutijarvi .................... | 455/456 |
| 2003/0078043 A1 | 4/2003 | Horwath et al. | |
| 2003/0190916 A1 | 10/2003 | Celedon et al. | |
| 2004/0203882 A1 * | 10/2004 | Laiho et al. ............. | 455/456.1 |
| 2004/0204097 A1 * | 10/2004 | Scheinert et al. .......... | 455/561 |

* cited by examiner

*Primary Examiner*—CongVan Tran
(74) *Attorney, Agent, or Firm*—Coats & Bennett, P.L.L.C.

(57) ABSTRACT

Methods of maintaining neighbor list information in a wireless communication system and corresponding apparatus. The method may comprise maintaining a separate neighbor list for each of a plurality of cells, the neighbor lists indicating neighbor cells and corresponding control channels; maintaining a central link-list database identifying, for each of the plurality of cells, neighbor cells and corresponding control channels; receiving a neighbor modification command; identifying which of the neighbor lists should be modified as affected neighbor lists based on the central link-list database in response to the command; automatically modifying a plurality of the affected neighbor lists in response to the command; and modifying the central link-list database in response to the command. The method may be used to delete or change the information in a plurality of neighbor lists concerning a cell, and does not require the link-list database in all embodiments.

15 Claims, 3 Drawing Sheets

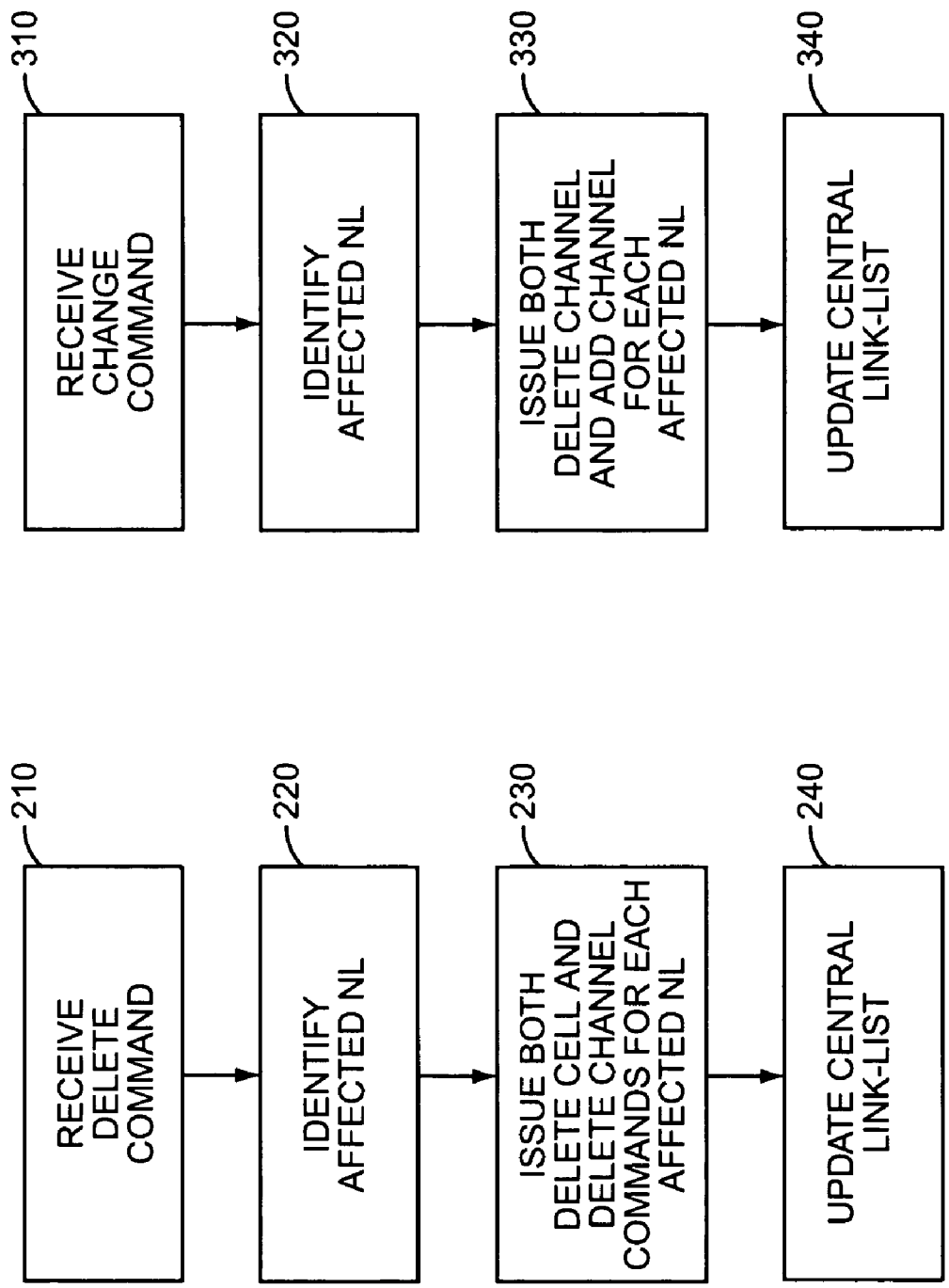

MANAGEMENT OF NEIGHBOR LISTS

BACKGROUND OF THE INVENTION

The present invention generally relates to wireless communication systems, and particularly relates to the management of neighbor lists in wireless communication systems.

A wireless communication system for communicating with mobile terminals is typically divided up into a plurality of cells. While a mobile terminal is in one cell, it is common for the mobile terminal to monitor channels belonging to other nearby cells, particularly in anticipation of being handed-off to another cell. Typically, the mobile terminal does not monitor all possible channels, but instead monitors the channels on a so-called neighbor list. This neighbor list is typically provided to the mobile terminal on the control channel of current cell by the base station of the current cell. Thus, each base station transmits the neighbor list to the mobile terminals that are using that cell, based on a stored neighbor list for that cell. As cells are added or deleted, and/or as the assignment of control channels to particular cells changes, the contents of the stored neighbor lists need to be updated to reflect the new arrangements, so that the mobile terminals are provided with correct neighbor list information.

SUMMARY OF THE INVENTION

The present invention provides a method of maintaining neighbor list information in a wireless communication system. In one embodiment, the method comprises maintaining a separate neighbor list for each of a plurality of cells, the neighbor lists indicating neighbor cells and corresponding control channels; maintaining a central link-list database identifying, for each of the plurality of cells, neighbor cells and corresponding control channels; receiving a neighbor modification command; automatically identifying which of the neighbor lists should be modified as affected neighbor lists based on the central link-list database in response to the command; automatically modifying a plurality of the affected neighbor lists in response to the command; and modifying the central link-list database in response to the command.

In another embodiment, the method comprises receiving a delete neighbor command identifying a first cell; automatically identifying a plurality of neighbor lists that should be modified in response to the command; and automatically deleting at least a neighbor relation to the first cell and at least one control channel identifier from a plurality of the identified neighbor lists in response to the command.

In another embodiment, the method comprises receiving a change neighbor command identifying a first cell; automatically identifying a plurality of neighbor lists that should be modified in response to the command; and automatically changing a control channel identifier associated with the first cell in a plurality of the identified neighbor lists in response to the command.

Various apparatus operative to implement one or more of the methods described above are also described.

BRIEF DESCRIPTION OF THE DRAWINGS

FIG. 4 shows a process flowchart according to one or more embodiments of the present invention.

FIG. 5 shows a process flowchart according to one or more embodiments of the present invention.

DETAILED DESCRIPTION OF THE INVENTION

Figure 1:
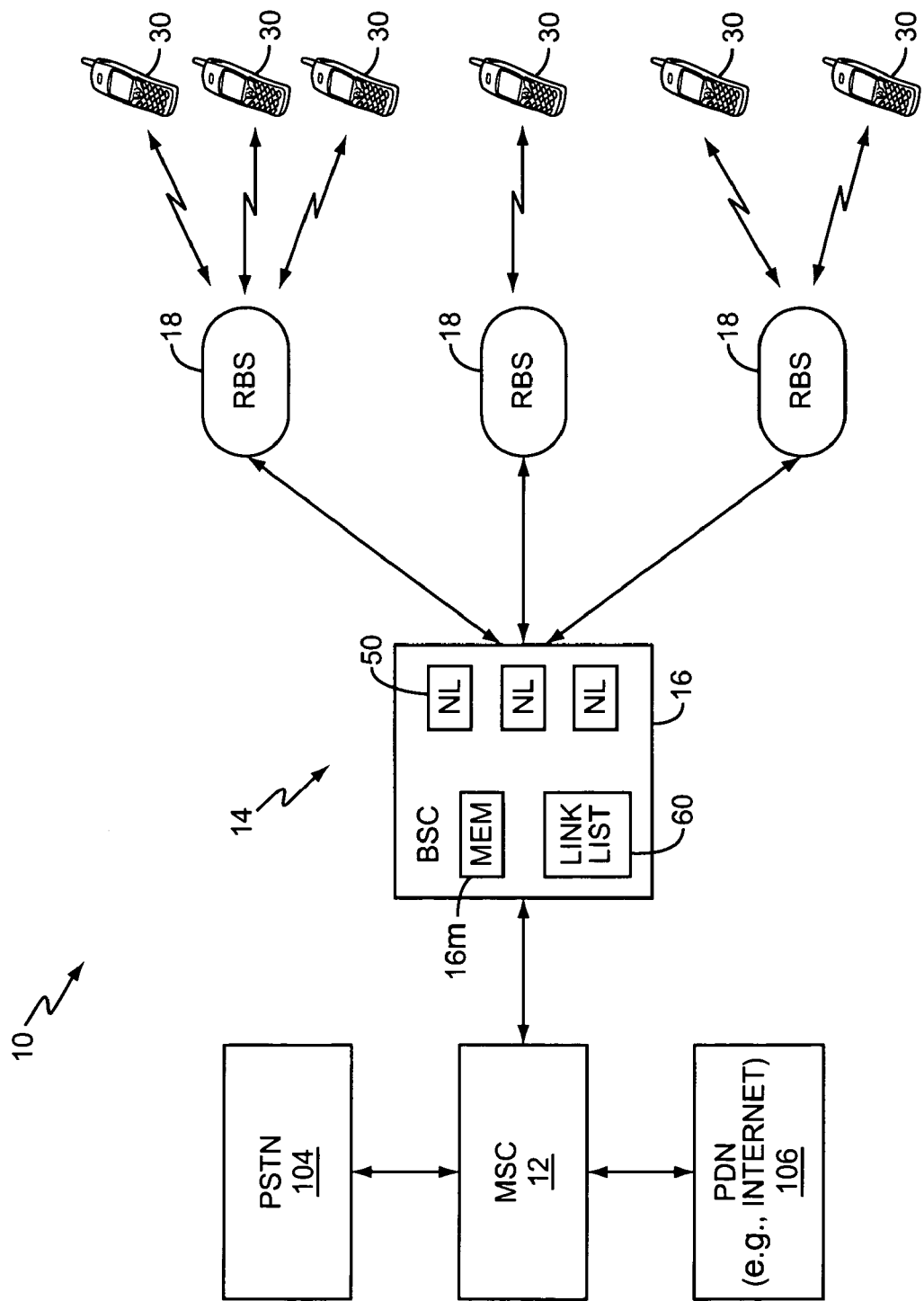
FIG. 1 shows a wireless communication network that may operate according to one or more embodiments of the present invention.
Figure 3:
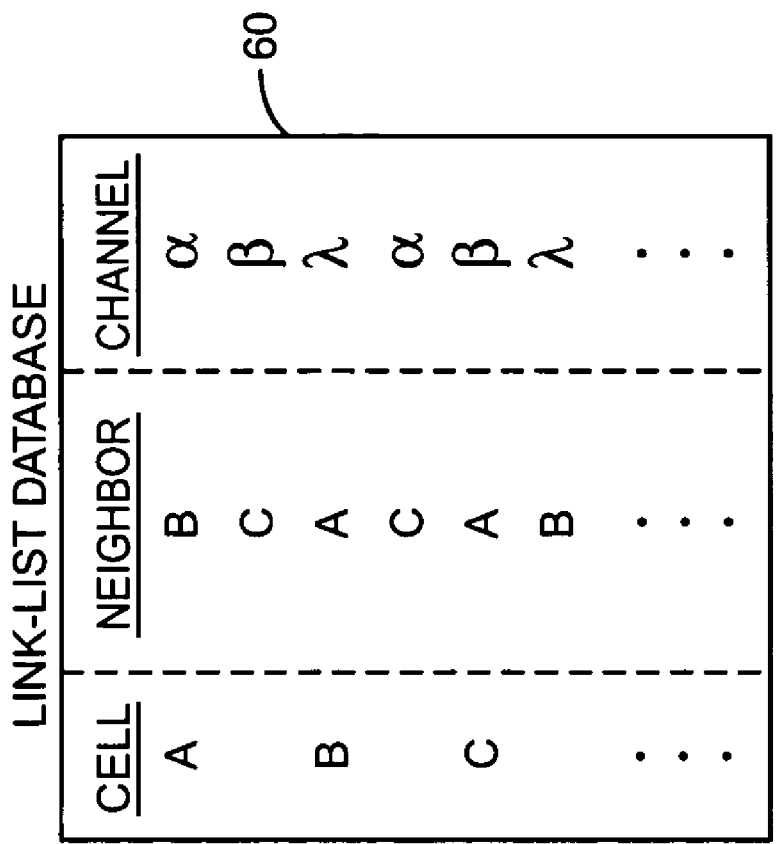
FIG. 3 shows one embodiment of a link-list database.
Figure 2:
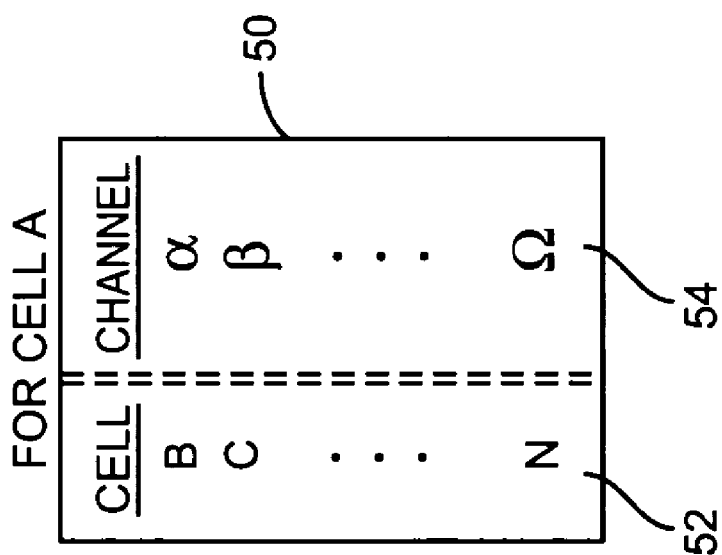
FIG. 2 shows one embodiment of a neighbor list.

FIG. 1 shows an exemplary wireless communication network 10, which may be configured as a GSM network. In general, network 10 typically includes a Mobile Switching Center (MSC) 12 coupled to a plurality of base stations 14a–c (generically 14). The MSC 12 generally oversees the functioning of the network 10. The MSC 12 may also serve as a connection between the communication network 10 and various external networks such as the Public Switched Telephone Network (PSTN) 104 and one or more Public Data Networks (PDNs, e.g., the Internet) 106. Mobile terminals 30 communicate with the base stations 14 via the "air interface" as defined by the appropriate network standards. Those skilled in the art will appreciate that other network architectures may be used, and that network 10 may include more or different entities as needed or desired. In general, detailed knowledge of the operational functions of the wireless communication network 10 is not necessary for understanding the present invention, and such details are not discussed further herein as they are considered to be understood by those of ordinary skill in the art.

As shown in FIG. 1, each base station 14 is typically in direct communication with a plurality of mobile terminals 30. While a maximum of three mobile terminals 30 are shown in communication with a given base station 14 in FIG. 1, it should be understood that any number of mobile terminals 30 may be in direct communication with a given base station 14. Typically, a base station 14 includes a Base Station Controller (BSC) 16 and a Radio Base Station (RBS) 18. The RBS 18 typically includes the physical transmitter and antenna(s), along with some local intelligence. The BSC 16 oversees one or more RBS 18, acts as the interface between the RBS 18 and the MSC 12, and performs other functions known in the art. Relevant to the present discussion, the BSC 16 typically controls the administrative tasks associated with handoff and the like, and therefore typically maintains the relevant reference neighbor lists 50 associated with each RBS 18. Typically, multiple RBS 18 report to a single BSC 16, with each pairing thereof being referred to as a base station 14.

As understood by those of skill in the art, part of the downlink communications from the base station 14 to the mobile terminals 30 is over the base station's control channel(s). As is further understood by those of skill in the art, the base station 14 provides the mobile terminals 30 with a listing of nearby cells in the form of a so-called neighbor list. The base station 14 may actually identify the relevant cells and identify their corresponding control channels, but more typically the base station 14 simply provides a listing of the relevant control channels to the mobile terminals 30. The mobile terminals 30 then monitor the listed control channels as necessary and/or convenient, for various reasons, such as to identify other cells that may be able to provide better, and/or at least adequate, signal service, etc.

The individual neighbor list 50 for a given base station may be maintained in a variety of ways. One common approach is to have the neighbor list 50 be the combination of two sub-lists: the neighbor cell sub-list 52 and the neighbor channel sub-list 54. The neighbor cell sub-list 52 is simply a list of the identity of cells that have been defined as being in a neighbor relationship to that base station 14. For example, the neighbor cell sub-list 52 for cell A may list cells B, C, D, and Q as being neighbor cells. The neighbor channel sub-list 54 is simply a list of primary control channels that hopefully correspond to the cells listed in the neighbor cell sub-list 52. In most systems, the neighbor cell sub-list 52 and the neighbor control channel sub-list 54 can be modified independently, but the combination is viewed as the base station's individual neighbor list 50. The base station 14 and mobile terminals 30 use the information in its individual neighbor list in a variety of ways well known to those of skill in the art, such as to assist in making hand-offs of the mobile terminals 30.

From time to time, the network operator may need to change cell architecture, such as to add or delete a cell, or to change a primary control channel assignment. When this happens, many of the existing neighbor lists 50 should be adjusted to reflect the change. Such adjustments may be made using an essentially manual process. For example, to delete an existing cell (e.g., cell C using channel β as its primary control channel), the network operator may print out the neighbor cell sub-list 52 for each base station 14 and identify which neighbor cell sub-lists 52 contain cell C. The network operator may then enter a cell-relationship-delete command for each affected base station 14 to delete cell C from their neighbor cell sub-list 52. The network operator may then enter a control-channel-delete command for each affected base station 14 to delete channel β from its neighbor channel sub-list 54.

Similarly, when a control channel for an existing cell is being changed (e.g., changing the control channel of cell B from Ψ to Ω), the network operator may print out the neighbor cell sub-list 52 for each base station 14 and identify which neighbor cell sub-lists 52 contain cell B. The network operator may then enter a control-channel-delete command for each affected base station 14 to delete channel Ψ from their neighbor channel sub-list 54. The network operator may then enter a control-channel-add command for each affected base station to add channel Ω to its neighbor channel sub-list 54.

The step-wise manual adjustment of the individual neighbor lists 50 for each of the various base stations 14 described above, when not carried out correctly, may lead to various undesirable artifacts being left in the neighbor lists 50 for some or all of the base stations 14. For example, if the network operator removes a control channel from the neighbor channel sub-lists 54 when deleting a cell from the system, but forgets to delete the cell identity from the neighbor cell sub-list 52, then cell hand-offs may not function properly. Likewise, if the network operator removes a cell identity from the neighbor cell sub-lists 52 when deleting a cell from the system, but forgets to delete the control channel from the neighbor channel sub-list 54, then the mobile terminals 30 may end up attempting to scan a control channel for no reason, thereby unnecessarily consuming mobile terminal resources such as processing and/or battery power.

According to one embodiment of the present invention, the network operator may use a more reliable process to delete a cell from the neighbor lists 50. Once the network operator has decided which cell to delete (using the example above, deleting cell C using channel β as its primary control channel), the network operator enters the appropriate command, denoted herein as a CELLDELETE command for ease of reference. In response receipt to the CELLDELETE command (box 210), the process software automatically examines a link-list database 60 to determine which base stations 14 are affected by the CELLDELETE command (box 220). The link-list database 60 is a database that identifies the neighbor cells and the corresponding primary control channels for each of the base stations 14 under the control of a given BSC 16. Conceptually, the link-list database 60 may be thought of as a centralized combination of the individual neighbor lists 50 for the various base stations 14. Once the affected base stations 14 are identified, the process continues by automatically sending the appropriate commands to delete the neighbor cell and the corresponding control channel from the individual neighbor lists 50 for the affected base stations 14 (box 230). For instance, the process may automatically send a cell-relationship-delete command for each affected base station 14 to delete cell C from their individual neighbor cell sub-list 52 and also send a neighbor-channel-delete command for each affected base station 14 to delete channel P from its neighbor channel sub-list 54. The cell-relationship-delete and neighbor-channel-delete commands are then implemented in the conventional fashion, by deleting cell C from the base station's neighbor cell sub-list 52 and deleting channel β from its neighbor channel sub-list 54, respectively. The process then adjusts the link-list database 60 accordingly to reflect that cell C using channel β as its primary control channel has been deleted (box 240).

Instead of deleting a cell, the network operator may wish to add a cell to the system 10. To do so, the network operator may issue a command to adding a cell to the appropriate neighbor lists 50, referred to herein as a CELLADD command. The CELLADD command identifies the cell being added, its primary control channel, its neighbor cells, and any other appropriate information. The CELLADD process then adds the new cell and its control channel to the individual neighbor cell sub-list 52 and neighbor channel sub-list 54, respectively, for the cells that are the new cell's neighbors. In addition, the CELLADD command creates a neighbor list 50 for the new cell filled with the information on its neighbor cells and their primary control channels. Finally, the CELLADD command updates the link-list database 60 to include the information about the new cell.

In another embodiment, the current invention provides another reliable way to update the individual neighbor lists 50. Using the example above, the network operator may decide to change the primary control channel of cell B from channel Ψ to channel Ω. The network operator would then enter the appropriate command, denoted herein as a CELLCHANGE command for ease of reference. In response to receiving the CELLCHANGE command (box 310), the process software automatically examines a link-list database 60 to determine which base station's neighbor lists 50 are affected by the CELLCHANGE command (box 320). Once the affected base stations 14 are identified, the process continues by automatically issuing the appropriate commands to change the listed control channel for cell B from channel Ψ to channel Ω within the individual neighbor lists 50 of the affected base stations 14 (box 330). For instance, the process may automatically send a control-channel-delete command for each affected base station 14 to delete channel Ψ from their neighbor channel sub-list 54 and also send a neighbor-channel-add command for each affected base station 14 to add channel Ω to its neighbor channel sub-list 54. The neighbor-channel-delete and neighbor-channel-add commands are then implemented in the conventional fashion, by deleting channel Ψ from the base station's neighbor channel sub-list 54 and adding channel Ω to its neighbor channel sub-list 54, respectively. Alternatively, a neighbor-channel-update command may replace the add/delete commands. The process then adjusts the link-list database 60 accordingly to reflect that cell B is using channel Ω as its primary control channel (box 340).

The link-list database 60 discussed above may advantageously be maintained in appropriate non-volatile memory in the BSC 16. Such a link-list database 60 may advantageously include the appropriate information for each of the RBS's 18 associated with a given BSC 16. Additionally, while the link-list database 60 may take the form of a conventional database, this is not required, and simple data file list may function as the link-list database 60. The initial link-list database 60 may be generated by conceptually printing the individual neighbor lists 50 of each base station 14 and joining them (advantageously with appropriate purging of obsolete information if any). This initial build process may take place all at once, or over time as the information for each base station 14 changes. Further, while the discussion above has been in terms deleting cells or changing control channels, steps should be taken to see that the information in the link-list database 60 is also updated appropriately when cells are added. Also, the updating of the link-list database 60 (e.g., box 240 or box 340) in response to an addition, deletion, or change, may take place before or after the issuance of the commands directed at the individual neighbor lists (e.g., box 230 or box 330).

The discussion above has been in terms of a wireless communication system 10 operating according to the GSM protocol. However, it should be noted that the that the wireless communication system 10 may alternatively use any known Time Division Multiple Access (TDMA) protocol, such as IS-136 or GSM/EDGE, or according to any Code Division Multiple Access (CDMA) protocol, including WCDMA, or any other known wireless communication protocol.

Given its broad range of applications and the variety of systems in which the present invention may be implemented, those skilled in the art should appreciate that the various embodiments of the present invention may be embodied in any number of specific physical implementations, including but not limited to the exemplary embodiment illustrated in the Figures. More generally, the present invention may be embodied in hardware and/or software (including firmware, resident software, micro-code, etc.). Furthermore, some embodiments of the present invention may take the form, in whole or in part, of a computer program product on a computer-usable or computer-readable program code embodied in a computer readable medium for use by, or in connection with, an instruction execution system. In the context of this document, a computer-usable or computer-readable medium may be any medium that can contain, store, communicate, propagate, or transport the program for use by or in connection with the instruction execution system, apparatus, or device. By way of non-limiting example, the computer readable medium may take the form of suitable memory 16*m* in BSC 16 (e.g., random access memory, read only memory, programmable array logic, disk drive, etc.), which may contain suitable program instructions to implement the method(s) described above. It should be further noted that the neighbor lists 50 and the link-list database 60 may be stored in memory 16*m* or in other suitable memory accessible to, or part of, the BSC 16, the depending on the desired configuration of the BSC 16.

Additionally, those skilled in the art should recognize that, in general, the foregoing description and the accompanying illustrations represent exemplary embodiments of the present invention and should not be construed as limiting it. Indeed, the present invention is limited only by the following claims and the reasonable equivalents thereof.

What is claimed is:

1. A method of maintaining neighbor list information in a wireless communication system, comprising:
   maintaining a separate neighbor list for each of a plurality of cells, said neighbor lists indicating neighbor cells and corresponding control channels;
   maintaining a central link-list database identifying, for each of said plurality of cells, the neighbor cells and corresponding control channels;
   receiving a neighbor modification command responsive to a change in a system architecture associated with said wireless communication system;
   automatically identifying which of said neighbor lists should be modified as affected neighbor lists based on said central link-list database in response to said command;
   automatically modifying a plurality of said affected neighbor lists in response to said command by performing at least one of the following:
      automatically deleting at least one neighbor relation from each of said plurality of affected neighbor lists in response to said command;
      automatically adding at least one neighbor relation to each of said plurality of the affected neighbor lists in response to said command; and
      automatically changing at least one control channel identified in each of said plurality of affected neighbor lists in response to said command; and
   automatically modifying said central link-list database in response to said command.

2. The method of claim 1 wherein automatically modifying a plurality of said affected neighbor lists in response to said command comprises automatically deleting at least one control channel from each said affected neighbor list.

3. The method of claim 2 wherein automatically deleting at least one control channel from each said affected neighbor list comprises automatically deleting at least one control channel from a neighbor channel sub-list of each said affected neighbor list.

4. The method of claim 1 wherein automatically modifying a plurality of said affected neighbor lists in response to said command comprises automatically deleting at least one neighbor relation and at least one control channel from each said affected neighbor list.

5. The method of claim 4 wherein automatically deleting at least one neighbor relation and at least one control channel from each said affected neighbor list comprises automatically deleting at least one control channel from a neighbor channel sub-list and automatically deleting at least one neighbor relation from a neighbor cell sub-list of each said affected neighbor list.

6. The method of claim 1 wherein automatically modifying a plurality of said affected neighbor lists in response to said command comprises automatically updating at least one control channel in each said affected neighbor list.

7. The method of claim 6 wherein automatically updating at least one control channel from each said affected neighbor list comprises automatically deleting at least one control channel from a neighbor channel sub-list and automatically adding another control channel to said neighbor channel sub-list of each said affected neighbor list.

8. The method of claim 1 wherein automatically modifying a plurality of said affected neighbor lists in response to said command comprises automatically updating at least one neighbor relation and at least one control channel in each said affected neighbor list.

9. A method of maintaining neighbor list information in a wireless communication system, comprising:
  receiving a delete neighbor command identifying a first cell; automatically identifying a plurality of neighbor lists that should be modified in response to said command; and
  automatically deleting at least a neighbor relation to said first cell and at least one control channel identifier from a plurality of said identified neighbor lists in response to said command.

10. The method of claim 9 wherein automatically identifying a plurality of neighbor lists that should be modified in response to said command comprises automatically identifying a plurality of neighbor lists that should be modified in response to said command based on a central link-list database that identifies neighbor cells and corresponding control channels for a plurality of cells.

11. A method of maintaining neighbor list information in a wireless communication system, comprising:
  receiving a delete neighbor command identifying a first cell;
  automatically identifying a plurality of neighbor lists that should be modified in response to said command;
  automatically deleting at least a neighbor relation to said first cell and at least one control channel identifier from a plurality of said identified neighbor lists in response to said command; and
  wherein automatically deleting at least a neighbor relation to said first cell and at least one control channel identifier from a plurality of said identified neighbor lists in response to said command comprises automatically deleting at least one control channel from a neighbor channel sub-list and automatically deleting at least the neighbor relation to said first cell from a neighbor cell sub-list of each said identified neighbor lists.

12. A method of maintaining neighbor list information in a wireless communication system, comprising:
  receiving a change neighbor command identifying a first cell;
  automatically identifying a plurality of neighbor lists that should be modified in response to said command; and
  automatically changing a control channel identifier associated with said first cell in a plurality of said identified neighbor lists in response to said command.

13. The method of claim 12 wherein automatically identifying a plurality of neighbor lists that should be modified in response to said command comprises automatically identifying a plurality of neighbor lists that should be modified in response to said command based on a central link-list database that identifies neighbor cells and corresponding control channels for a plurality of cells.

14. A method of maintaining neighbor list information in a wireless communication system, comprising:
  receiving a change neighbor command identifying a first cell;
  automatically identifying a plurality of neighbor lists that should be modified in response to said command;
  automatically changing a control channel identifier associated with said first cell in a plurality of said identified neighbor lists in response to said command; and
  wherein automatically changing a control channel identifier associated with said first cell in a plurality of said identified neighbor lists in response to said command comprises automatically deleting at least one control channel from a neighbor channel sub-list and automatically adding another control channel to said neighbor channel sub-list of each said identified neighbor lists.

15. The method of claim 1 wherein automatically modifying said central link-list database comprises performing at least one of the following:
  automatically deleting at least one cell relationship from said central link-list database in response to said command;
  automatically adding at least one cell relationship to said central link-list database in response to said command; and
  automatically changing at least one control channel identified in said central link-list database in response to said command.

* * * * *